United States Patent [19]
Bieschke

[11] 3,750,994
[45] Aug. 7, 1973

[54] MOUNTING DEVICE FOR PROJECTION SCREEN

[75] Inventor: Hillard J. Bieschke, Itasca, Ill.

[73] Assignee: Knox Manufacturing Company, Wood Dale, Ill.

[22] Filed: Feb. 24, 1972

[21] Appl. No.: 229,130

[52] U.S. Cl.................. 248/324, 160/24, 248/278
[51] Int. Cl. ........................................... G03b 21/56
[58] Field of Search................... 248/324, 325, 326, 248/278, 279, 284, 287, 291, 293, 292; 160/351, 24, 368, 26, 23; 287/14

[56] References Cited
UNITED STATES PATENTS

| | | | |
|---|---|---|---|
| 3,362,671 | 1/1968 | Johnson............................ | 248/324 |
| 2,653,036 | 9/1953 | Creel et al. ..................... | 248/293 X |
| 3,567,168 | 3/1971 | Jennings ............................ | 248/284 |
| 3,144,899 | 8/1964 | Stewart et al........................ | 160/24 |
| 1,676,896 | 7/1928 | Groenenstein...................... | 248/286 |
| 1,717,185 | 6/1929 | Caldwell ............................. | 248/286 |

*Primary Examiner*—J. Franklin Foss
*Attorney*—Axel A. Hofgren et al.

[57] ABSTRACT

A mounting device for supporting a projection screen from a ceiling including a first bracket adapted to be secured to an overhead support, a second bracket adapted to be secured to a casing for a rollable projection screen, means mounting the second bracket on the first bracket for pivotal movement about a horizontal pivot axis, and cooperating detent means on the two brackets for permitting free pivotal movement of the second bracket on the first bracket and for supporting and positively holding the second bracket in angularly adjusted positions such that the screen is inclined from vertical to avoid dimensional distortion which occurs if an image is projected to a screen inclined to the path of projection.

5 Claims, 5 Drawing Figures

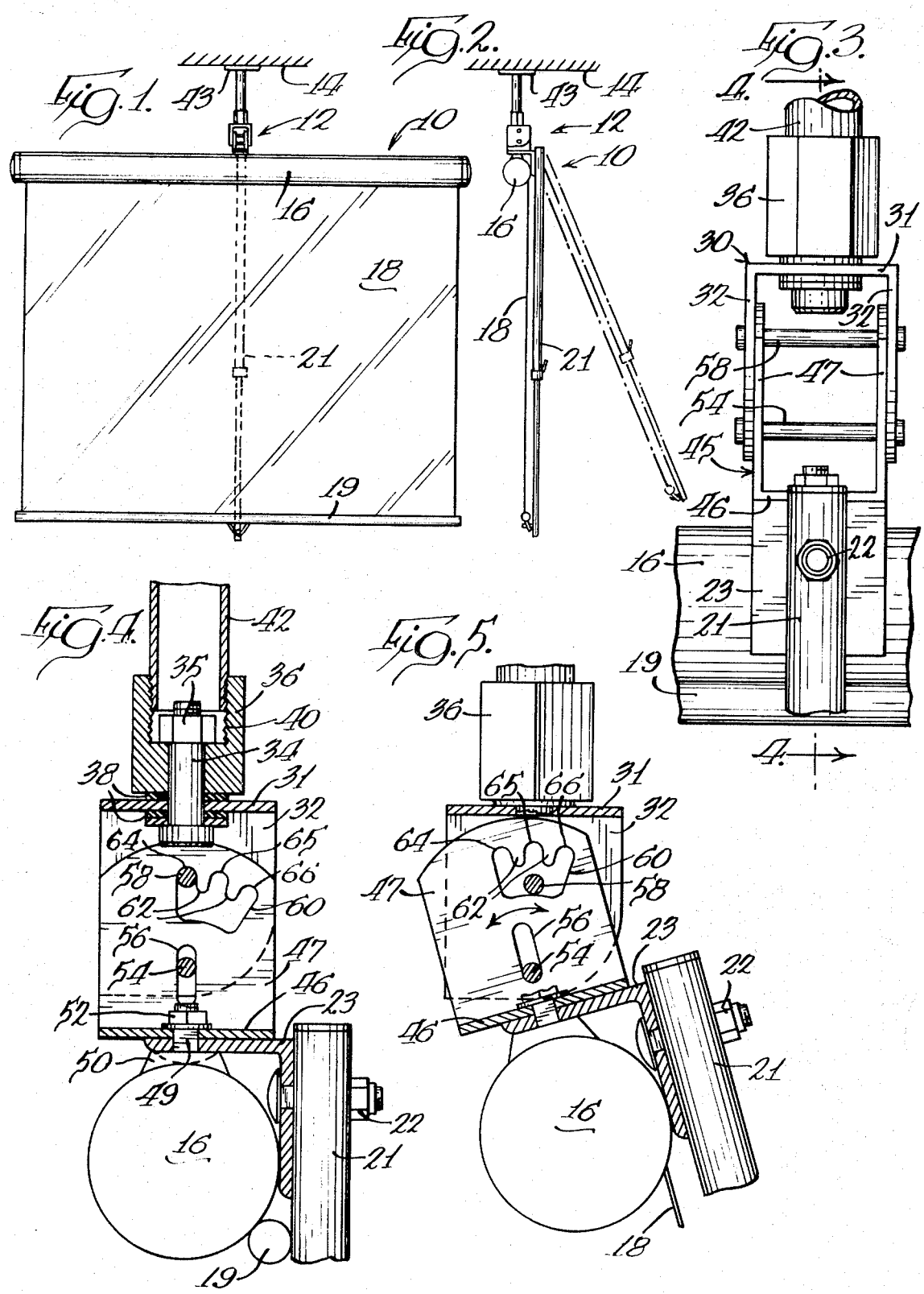

MOUNTING DEVICE FOR PROJECTION SCREEN

BACKGROUND OF THE INVENTION

The invention relates to a mounting device for supporting a projection screen from an overhead support such as a ceiling, including means providing for angular adjustment of the screen to one or more positions inclined to a vertical plane, for purposes of avoiding dimensional distortion, sometimes described as "keystoning," which occurs when an image is projected to a viewing screen which is inclined to the path of projection. "Keystoning" occurs with a projector at a relatively low level and a vertical screen disposed at a higher level such that a portion of the image travels further than other portions and therefore assumes a wider dimension, producing an image of trapezoidal outline.

In the past, there has been recognition of the problem of "keystoning" and other distortion in the dimensions of a projected image when the plane of the viewing screen is not perpendicular to the axis of the projected image. For example, U.S. Pat. No. 3,362,671 relates to an overhead suspension assembly for supporting a viewing screen in angularly adjusted positions inclined from the vertical. More particularly, a screen support is pivotally mounted on an overhead clamp clevis, and the clamp is adapted to be appropriately tightened to retain the screen support in angularly adjusted positions where the screen may be disposed perpendicular to the projected image. In such arrangement, the adjustment for the clamp is disposed at an elevated position near the ceiling, and is not readily accessible for release during periods of adjustment. As a result, efforts are made to swing the screen without releasing the clamp. Under these circumstances, the relatively long lever arm from the ceiling to the bottom of the screen contributes toward application of relatively great forces at the place when the suspension assembly is secured to the ceiling, and there is a substantial force tending to tear the suspension assembly away from the ceiling. If the clamp is loosened sufficiently to facilitate easy pivotal movement, then the screen will not stay in angularly inclined positions but tends to swing to the vertical. Thus, there is a need for an overhead mounting device for a projection screen wherein angular adjustment may be made freely and the screen is positively retained in angularly adjusted positions.

U.S. Pat. No. 523,482 relates to an incandescent lamp holder including a lamp support which is pivotally movable on an overhead bracket and spring-biased upwardly to engage ratchet teeth on the overhead bracket when the spring is released, but such a compressible spring is not suitable for supporting a relatively heavy projection screen assembly.

German patent 339,415 shows an overhead lamp suspension apparatus including a lower arm swivelly mounted on an upper support bracket, together with a spring-biased detent plunger on the lower arm adapted to engage apertures in the overhead support, but such an arrangement requires an operating connection from the remotely situated detent plunger to a manually accessible position convenient to reach.

SUMMARY OF THE PRESENT INVENTION

The present invention relates to a mounting device for supporting an overhead projection screen including a lower bracket supported on an upper bracket for pivotal and vertical movement, together with cooperating detent means on the two brackets for permitting free pivotal movement of the second bracket on the first bracket and also supporting and positively holding the second bracket in adjusted position.

More particularly, the mounting device includes a first bracket comprising an inverted U-shaped member having a crosspiece adapted to be secured to an overhead support and depending legs at opposite sides of the crosspiece, and a second bracket comprising an upright U-shaped member having a crosspiece adapted to be secured to a casing for a viewing screen and upright legs at opposite sides of the crosspiece respectively adjacent the legs of the first bracket.

Preferably, the means mounting the second bracket on the first bracket includes a pivot pin supported on the first bracket and disposed in a vertically elongated slot in the second bracket, so that the second bracket is vertically and pivotally movable on the first bracket.

In the preferred embodiment illustrated, the cooperating detent means on the two brackets includes a detent pin mounted on the first bracket and projecting through a detent recess in the second bracket, and detent teeth in the detent recess on the second bracket for engaging the detent pin on the first bracket to hold the second bracket in angularly adjusted positions.

An important advantage of the present invention resides in the freedom of relatively unrestricted pivotal movement together with provision for positively holding the screen in angularly adjusted positions. The screen is manipulated simply by lifting it sufficiently to disengage the cooperating detent means, whereupon free pivotal movement is permitted. The cooperating detent means are re-engaged simply by lowering the screen again in its angularly adjusted position.

BRIEF DESCRIPTION OF THE DRAWINGS

FIG. 1 is a front elevational view of an extended retractable projection screen in a casing supported by a mounting device embodying the principles of the present invention;

FIG. 2 is a side elevational view of the screen and mounting device illustrated in FIG. 1, also showing the screen in an angularly adjusted position;

FIG. 3 is an enlarged front elevational view of the mounting device illustrated in FIG. 1;

FIG. 4 is a vertical sectional view through the mounting device taken at about the line 4—4 of FIG. 3; and FIG. 5 is a sectional view similar to FIG. 4, showing the manner in which the lower bracket is adjustable on the upper bracket.

DETAILED DESCRIPTION OF PREFERRED EMBODIMENT

Referring to the drawings in more detail, FIG. 1 includes an illustration of a projection screen assembly 10 supported by a mounting device 12 from an overhead ceiling 14.

The screen assembly 10 may be similar to that illustrated in U.S. Pat. No. 3,191,663 and need not be described in complete detail herein. In general, it includes a tubular casing 16 in which a screen 18 is adapted to be stored in rolled condition. The lower end of the screen is provided with a relatively rigid reinforcing rod 19 which engages the outside of the casing 16 when the screen is retracted into the casing in rolled storage position as illustrated in FIG. 4. The reinforcing rod thus remains accessible to permit extension of the screen to the fully extended position illustrated in FIGS. 1 and 2. In order to maintain the screen in the extended position illustrated, use is made of a standard 21 having an upper end secured as by bolt 22 to an angular bracket 23 in turn secured to the casing 16. As in the aforementioned U.S. Pat. No. 3,191,663, the standard may be telescopically collapsible and pivotable about the mounting 22 for compact storage purposes. When the screen 18 is fully extended, a tab or hook at 25 may be secured to the lower end of the standard 21 to hold the screen in extended position against the tension of a screen rewind spring.

The mounting device 12 includes a first upper inverted U-shaped bracket 30 having a crosspiece 31 and depending spaced parallel vertical legs 32. The crosspiece 31 of the bracket 30 is adapted to be mounted on an overhead support. As illustrated herein, the crosspiece 31 is mounted for pivotal movement about a vertical axis by means of a bolt 34 having a head disposed beneath the crosspiece 31, a shank passing through the crosspiece 31, and a nut 35 at the upper end securing an enlarged collar 36 on the bolt. Preferably, antifriction washers are provided as at 38 on opposite surfaces of the crosspiece 31 to facilitate angular adjustment of the bracket 30 as desired. The collar 36 has a threaded recess 40 receiving the threaded lower end of a support rod 42 having an enlarged flange 43 at the upper end adapted to be secured to the ceiling 14 as by means of screws or bolts.

In order to support the viewing screen for pivotal adjustment, a lower bracket 45 is movably mounted on the upper bracket 30. The lower bracket 45 comprises an upright U-shaped member including a crosspiece 46 and spaced parallel upright legs 47 disposed within the upper bracket respectively closely adjacent the legs 32 of the upper bracket. The crosspiece 46 of the lower bracket is secured to the casing 16 by means of a bolt 49 passing through a boss 50 on the tubular casing 16, passing through the upper flange of the angular bracket 23, and passing through the crosspiece 46. The bolt 49 is secured in place by a nut 52.

The lower bracket 45 is mounted on the upper bracket 30 by means of a pivot pin or bolt 54 having opposite ends supported in the legs 32 of the upper bracket and passing through vertically elongated slots 56 in the legs 47 of the lower bracket. The pin 54 in the slots 56 permits vertical movement of the lower bracket on the upper bracket and pivotal movement of the lower bracket relative to the upper bracket.

The lower bracket is retained in angularly adjusted positions by means of cooperating detent means on the two brackets including a transverse horizontally disposed detent pin or bolt 58 having opposite ends supported in the legs 32 of the upper bracket and passing through vertically elongated and angularly elongated recesses 60 in the legs 47 of the lower bracket at positions disposed above the slots 56. Each of the recesses 60 in the lower bracket is defined at the upper edge by spaced projecting detent teeth as at 62 which define a plurality of intervening detent recesses 64, 65 and 66 adapted respectively to receive the detent bolt 58 with the bracket 45 in angularly adjusted positions.

In operation, it will be seen on viewing FIG. 4 that when the detent bolt 58 is disposed in the detent recess 64, the lower bracket 45 is disposed in a substantially vertical position and the viewing screen 18 when extended will be disposed substantially in a vertical plane.

In order to adjust the viewing screen to angularly inclined positions relative to a vertical plane, the standard 21 may be grasped manually to elevate the entire screen assembly and the lower bracket 45 to a position where the detent bolt 58 is free of the detent recesses 64, 65 and 66 so that the lower bracket 45 may be angularly adjusted as illustrated in FIG. 5. If the entire screen assembly is lowered in a position illustrated in FIG. 5, the detent bolt 58 will be disposed in detent recess 65 and the screen will be held positively in the angularly inclined position illustrated. The screen may be freely moved pivotably about the axis of the pivot pin 54 simply by lifting the screen sufficiently to free the detent bolt 58 from the detent recesses 64, 65 or 66. In the various angularly adjusted positions, the lower bracket and the screen assembly are supported on the upper bracket by means of the detent bolt 58, as a result of which the adjusted position is maintained positively by action of gravity without the need of supplementary biasing means or detent means separate from the brackets.

I claim:

1. A ceiling mount for hanging a projection screen in angularly adjusted positions, comprising,
   a. a first bracket of inverted U-shape having a crosspiece adapted to be secured to a ceiling and depending legs at opposite sides of the crosspiece,
   b. a second bracket of upright U-shape having a crosspiece adapted to be secured to a casing for a rollable projection screen and upright legs at opposite sides of the crosspiece,
   c. means mounting the second bracket on the first bracket for pivotal movement about a horizontal pivot axis and for vertical movement relative to the pivot axis,
   d. a horizontally disposed detent pin on the first bracket projecting into an enlarged aperture in one leg of the second bracket permitting vertical movement and angular movement of the second bracket on the first bracket, and
   e. a plurality of angularly adjacent detent recesses in said one leg of the second bracket opening into said aperture for receiving said detent pin to hold the second bracket positively in angularly adjusted positions inclined slightly from vertical while permitting free vertical and pivotal movement of the second bracket between adjusted positions.

2. A ceiling mount for hanging a projection screen in angularly adjusted positions, comprising,
   a. a first bracket of inverted U-shape having a crosspiece adapted to be secured to a ceiling and depending legs at opposite sides of the crosspiece,
   b. a second bracket of upright U-shape having a crosspiece adapted to be secured to a casing for a rollable projection screen and upright legs at opposite sides of the crosspiece,
   c. a horizontally disposed pivot pin on the first bracket mounting the second bracket for pivotal movement and vertical movement,
   d. a horizontally disposed detent pin on the first bracket, and
   e. a plurality of detent recesses on the second bracket facing downwardly for receiving said detent pin to hold the second bracket positively in angularly adjusted positions while permitting free vertical and pivotal movement of the second bracket between adjusted positions.

3. A mounting device for hanging a projection screen in angularly adjusted positions, comprising,
   a. a first bracket adapted to be secured to an elevated support and having spaced parallel legs,
   b. a second bracket adapted to be secured to a casing for a projection screen and having spaced parallel legs adjacent the legs of the first bracket,
   c. a horizontally disposed pivot pin having opposite ends mounted in the legs of the first bracket and passing through vertically elongated slots in the legs of the second bracket for mounting the second bracket for pivotal movement and vertical movement,
   d. a horizontally disposed detent pin having opposite ends mounted in the legs of the first bracket and passing through vertically elongated and angularly elongated recesses in the legs of the second bracket, and
   e. a plurality of angularly spaced detent teeth projecting downwardly in each of the detent recesses on the second bracket for engaging said detent pin to hold the second bracket in angularly adjusted positions.

4. A ceiling mount for hanging a projection screen in angularly adjusted positions, comprising,
   a. a first bracket of inverted U-shape having a crosspiece adapted to be secured to a ceiling support and depending legs at opposite sides of the crosspiece,
   d. a second bracket of upright U-shape having a crosspiece adapted to be secured to a casing for a retractable projection screen and upright legs at opposite sides of the crosspiece positioned between the depending legs of the first bracket,
   c. a horizontally disposed pivot pin having opposite ends secured on the legs of the first bracket,
   d. vertically elongated slots in the legs of the second bracket receiving the pivot pin and mounting the second bracket for vertical movement and pivotal movement relative to the pivot pin, and
   e. cooperating detent means on the two brackets for positively holding the second bracket in adjusted positions and for permitting free pivotal movement of the second bracket in opposite directions responsive to movement of the second bracket on the first bracket.

5. A ceiling mount as defined in claim 4, wherein said cooperating detent means comprises
   a horizontally disposed detent pin having opposite ends secured in the legs of the first bracket above the pivot pin,
   an enlarged aperture in each leg of the second bracket receiving the detent pin and permitting vertical movement and angular movement of the second bracket on the first bracket, and
   a plurality of angularly spaced detent recesses in the legs of the second bracket opening into each aperture for receiving said detent pin to hold the second bracket positively in angularly adjusted positions while permitting free vertical and pivotal movement of the second bracket between adjusted positions.

* * * * *